Patented Oct. 18, 1938

2,133,297

UNITED STATES PATENT OFFICE 2,133,297

ANTIOXIDANTS

Paul C. Jones, Akron, Ohio, assignor to The B. F. Goodrich Company, New York, N. Y., a corporation of New York No Drawing. Application May 27, 1936, Serial No. 82,066

19 Claims. (Cl. 18—50)

This invention relates to the art of rubber manufacture and has as its chief object to provide antioxidants which will not only greatly retard the natural deterioration of rubber, but which will prevent or retard the failure of the rubber when subjected to rapidly repeated flexing, and which will not discolor the rubber so that they can be used in white or light-colored rubber or rubber in contact with light-colored textile materials.

The antioxidants of this invention are aliphatic mono-ethers of hydroquinone or of its homologues such as toluhydroquinone or xylohydroquinone and have the general structural formula R—O—A—OH wherein A represents a para-arylene group and wherein R represents a monovalent aliphatic hydrocarbon group such as a methyl, ethyl, propyl, isopropyl, butyl, isobutyl, secondary butyl, tertiary butyl, amyl, hexyl, decyl, hexadecyl or other alkyl group, either straight or branched chain; allyl, crotyl and other unsaturated groups, or a cyclic hydrocarbon group, either cycloaliphatic or aralkyl, such as a cyclopentyl, cyclohexyl, methyl-cyclohexyl, cyclohexenyl, benzyl, methylbenzyl, cuminyl, mesityl, phenethyl, hydrocinnamyl and menaphthyl groups, which, although not strictly aliphatic in nature, undergo the characteristic reactions of and confer upon their compounds essentially the same properties as purely aliphatic groups. Any one of these compounds may be incorporated in a rubber composition with good effect on its resistance to aging, either alone or together with other antioxidants of the same class or of different classes. In some cases the best results are obtained by using them together with an organic base such as one of the well known basic accelerators of vulcanization or a diarylamine or a non-accelerating heterocyclic base, but in those cases in which it is desired to avoid discoloration it is preferred to rely entirely on the new antioxidants of the class described above for preventing an unduly rapid aging of the rubber.

As a specific example of one embodiment of the invention, a rubber composition is prepared containing 100 parts by weight of rubber, 5 parts of zinc oxide, 15 parts of titanium dioxide, 50 parts of whiting, 3 parts of stearic acid, one-third part of ultramarine blue, 1 part of hydrocarbon wax, 3 parts of sulphur, six-tenths part of mercaptobenzothiazole and one part of the mono-benzyl ether of hydroquinone. This composition is vulcanized for 45 minutes at 280° F. to give an optimum cure. It deteriorates on aging less than one-third as rapidly as the same composition without the mono-benzyl ether of hydroquinone. Furthermore, its tendency to crack when subjected to rapidly repeated flexing is almost entirely eliminated. It does not appreciably discolor, either in direct sunlight or in ordinary diffuse light. Similar results are obtained by substituting other aliphatic ethers, for instance, the mono-methyl ether of hydroquinone, the mono-isopropyl ether of hydroquinone, or any one of the four isomeric mono-butyl ethers of hydroquinone, for the mono-benzyl ether of this example.

The antioxidants of this invention appear to be unique in their ability not only to retard the loss in strength which accompanies aging, but also to suppress the flex cracking of rubber, without discoloring the rubber.

Although the antioxidants of this invention are peculiarly useful in white or light colored rubber because of their ability to retard deterioration without danger of discoloration, they may obviously be used also to retard the deterioration of dark colored rubber compositions, or of compositions consisting of or containing unvulcanized rubber, gutta percha, balata, artificial rubber isomers, synthetic rubber or synthetic rubber-like materials and the like. It is accordingly to be understood that the term "rubber" is employed in the claims in a generic sense to include all such rubber-like materials; and that the term "aliphatic" unless otherwise limited, is to be understood as including all substituent groups which confer the characteristic properties of aliphatic compounds on their derivatives, as opposed to aromatic groups which confer different and distinctly aromatic properties on their derivatives, and particularly as including all groups hereinbefore referred to as aliphatic in nature.

I claim:

1. The method of retarding the deterioration of rubber which comprises treating rubber with a mono-(monovalent aliphatic hydrocarbon) ether of a compound of the homologous series of which hydroquinone is the first member.

2. The method of retarding the deterioration of rubber which comprises treating rubber with a compound having the structural formula

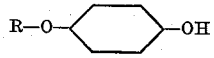

wherein R represents a monovalent aliphatic hydrocarbon group.

3. The method of retarding the deterioration of rubber which comprises treating rubber with a compound having the structural formula

wherein R represents a monovalent cyclic aliphatic hydrocarbon group.

4. The method of retarding the deterioration of rubber which comprises treating rubber with a compound having the structural formula

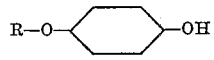

wherein R represents an aralkyl group.

5. The method of retarding the deterioration of rubber which comprises treating rubber with the mono-benzyl ether of hydroquinone.

6. The method of retarding the deterioration of rubber which comprises treating rubber with a mono-alkyl ether of hydroquinone.

7. The method of retarding the deterioration of rubber which comprises treating rubber with the mono-methyl ether of hydroquinone.

8. The method of retarding the deterioration of rubber which comprises treating rubber with a mono-propyl ether of hydroquinone.

9. The method of retarding the deterioration of rubber which comprises treating rubber with the mono-isopropyl ether of hydroquinone.

10. The method of retarding the deterioration of rubber which comprises treating rubber with a compound having the structural formula

wherein R represents a branched chain alkyl group.

11. A rubber composition comprising rubber and a mono-(monovalent aliphatic hydrocarbon) ether of a compound of the homologous series of which hydroquinone is the first member.

12. A rubber composition comprising rubber and a compound having the structural formula

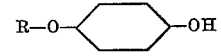

wherein R represents a monovalent aliphatic hydrocarbon group.

13. A rubber composition comprising rubber and a compound having the structural formula

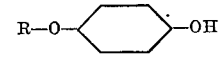

wherein R represents a monovalent cyclic aliphatic hydrocarbon group.

14. A rubber composition comprising rubber and a mono-aralkyl ether of hydroquinone.

15. A rubber composition comprising rubber and the mono-benzyl ether of hydroquinone.

16. A rubber composition comprising rubber and a mono-alkyl ether of hydroquinone.

17. A rubber composition comprising rubber and the mono-methyl ether of hydroquinone.

18. A rubber composition comprising rubber and a compound having the structural formula

wherein R represents a branched chain alkyl group.

19. A rubber composition comprising rubber and the mono-isopropyl ether of hydroquinone.

PAUL C. JONES.